Feb. 15, 1938.   J. H. GOULD   2,108,119
BUMPER GUARD
Filed March 27, 1937
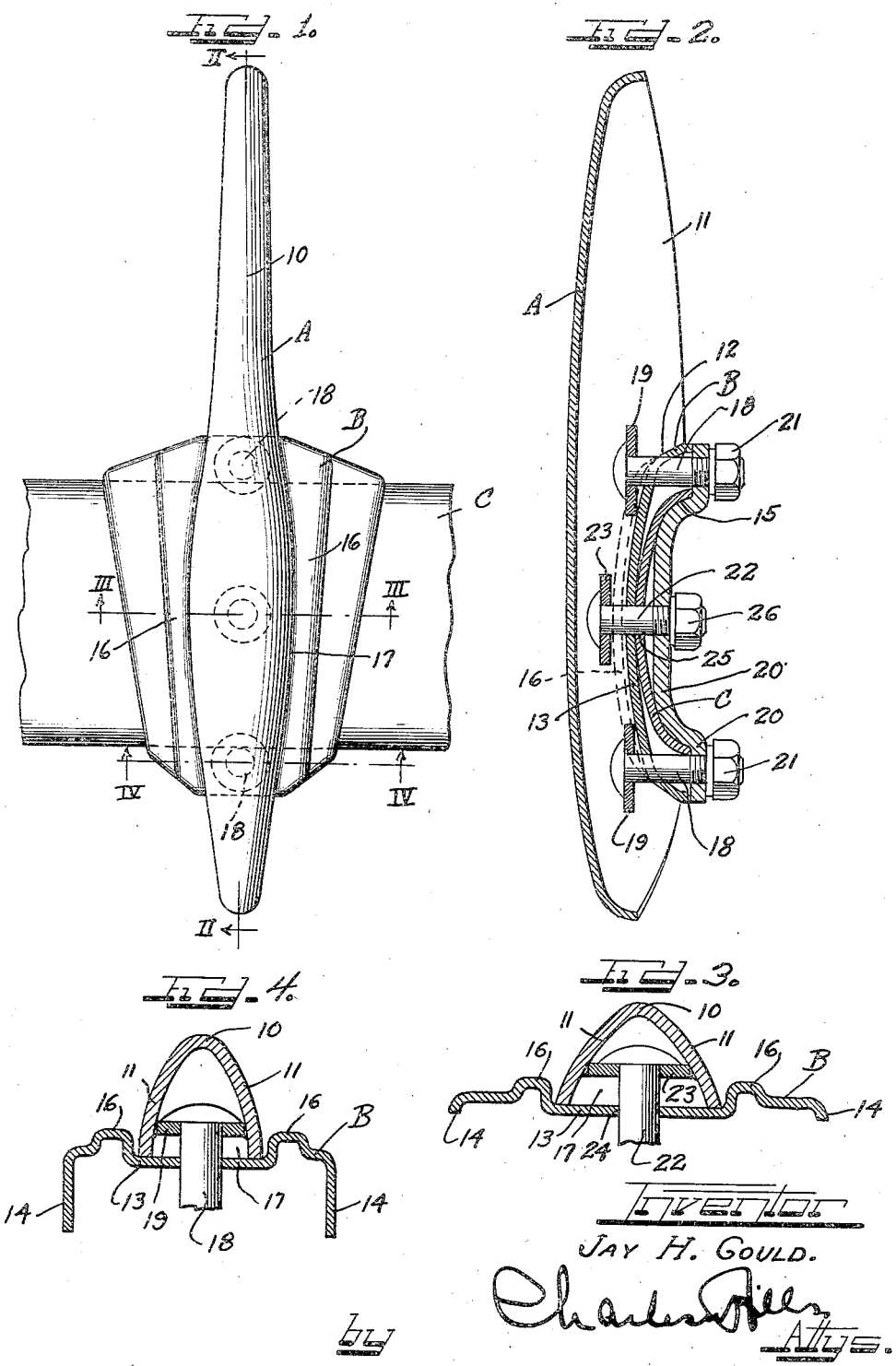
Inventor
JAY H. GOULD.

Patented Feb. 15, 1938

2,108,119

UNITED STATES PATENT OFFICE 2,108,119

BUMPER GUARD

Jay H. Gould, Royal Oak, Mich., assignor to Oakes Products Corporation, Detroit, Mich., a corporation of Michigan Application March 27, 1937, Serial No. 133,322

8 Claims. (Cl. 293—55)

This invention relates to bumper guard structure which may be applied at any desired location on the horizontal impact bar of the front and rear bumpers of an automobile, but which is particularly useful and desirable for location at the middle of the impact bar so that when placed at the middle of the impact bar of the front bumper structure it will afford protection for the radiator and the grille in front thereof, and when applied at the middle of the impact bar of the rear bumper structure it will serve to protect structure at the rear of the vehicle such as a spare tire and its support.

An important object of the invention is to form the guard structure of two separate members, one member being the bumper guard body which extends vertically in front of a bumper impact bar, and the other member being in the form of an adapter plate shaped to afford secure seating thereon of the bumper guard body and in turn shaped to securely seat against the front face of the impact bar.

A further important object is to provide an arrangement in which a single design bumper guard body may be associated with a suitable series of adapter plates to accommodate various shapes of bumper impact bars, with the adapter plates susceptible of a number of artistic variations for differentiating one installation from another.

The above enumerated and other features of the invention are incorporated in the structure shown on the drawing, in which drawing:

Figure 1 is a front elevation of the bumper guard assembly mounted on an impact bar;

Figure 2 is a section on plane II—II, Figure 1;

Figure 3 is an enlarged section on plane III—III, Figure 1; and

Figure 4 is an enlarged section on plane IV—IV, Figure 1.

The guard body A is formed of suitable sheet metal and is of V-shaped cross section to present the front impact wall or crest portion 10 and the inclined side wall portions 11. These walls 11, at the rear thereof, have recesses 12 of fixed shape and contour, the recesses shown being generally convexed forwardly.

The adapter plate or base B is also formed of sheet metal and as shown, comprises a front wall 13 from which marginal flanges 14 extend rearwardly. These marginal portions or flanges have recesses 15 of a size and contour to receive a bumper structure impact bar C and to accurately fit the front face transverse curvature of the bar. Inwardly of the marginal or side flanges 14, the front wall 13 of the adapter plate is deflected to provide forwardly extending aligning ribs or beads 16 to form a vertically extending groove 17 for receiving the guard body A at its recesses 12, the curvature or convexity of the grooved bottom accurately fitting the recesses 12 of the guard body so as to provide a secure seating for the body, the ribs or beads 16 being shaped to be engaged along their entire extent by the side wall portions 11 of the guard body so that the guard body will be held in proper vertical alignment on the plate and relative to the impact bar C.

Any suitable means or arrangement may be employed for clamping the guard body and adapter plate assembly to a bumper bar. As shown, upper and lower clamping bolts 18 may be provided anchored by their heads to cross plates 19 in the guard body and extending rearwardly and spaced vertically apart a sufficient distance to receive between them the bumper impact bar C, a bar 20 receiving the bolts and against which the bolt nuts 21 engage. The center portion 20' of the clamping bar 20 may be deflected or convexed forwardly to fit the rear side of the bumper impact bar and to afford additional vertical supports for the bar structure. The plates 19 may be secured to the side walls 11 of the guard body by welding.

If further security is desired, a bolt 22 may be provided intermediate the bolts 18 and anchored to a plate 23 welded to the side walls of the guard body, and this bolt 22 will then extend through a bolt hole 24 in the wall 13 of the plate B and through the bolt hole 25 in the bumper bar and through a bolt hole in the clamping bar 20 for reception of a nut 26.

The guard body may be of a standard construction and design, and backing plates of different shapes for ornamental appearance may be associated therewith, the front of the backing plates being always shaped to seat and align the guard body but the rear side or the side flanges of the plates are differently recessed for receiving different types of bumper structure impact bars. The outer bolts 18 on the guard body will be sufficiently far apart to accommodate bumper bars of different width. The backing plate B shown is of keystone shape and may designate one type of automobile, but the plates may be made of different shapes, contours or ornamentation for designating other types of automobiles. In other words, the plates may serve as escutcheons for identifying different types of automobiles.

The guard assembly may be located at any desired point on a bumper bar. The guard body of the assembly shown is slender and extends a comparatively long distance above the bumper bar, this type of assembly being therefore desirable and useful for location at the middle of a bumper bar. When placed at the middle of a front bumper bar, the guard body will protect the radiator and the grille in front thereof on an automobile, and, when placed at the middle of a rear bumper bar, structure on the rear of the vehicle, such as a spare tire or its support, will be better protected against impact by bumpers on other cars. By making the guard body slender and slim, it will offer the least amount of obstruction to air current passing into the radiator when the guard structure is mounted upon the middle of the front bumper bar.

I have shown a practical and efficient embodiment of the various features of my invention but I do not desire to be limited to the exact construction and arrangement shown and described as changes and modifications may be readily made without departing from the scope of the invention.

I claim as follows:

1. In bumper guard structure, a guard body having a seating recess in its rear side, and an adapter plate wider than said body for seating against the front face of an impact bar, the front side of said adapter plate being shaped to receive the guard body recess to form a secure seat for said body, the rear side of said plate being recessed to fit the curvature of a bumper impact bar, and means for clamping said body and plate together and to an impact bar.

2. A bumper guard structure comprising a body part for receiving impacts, a separate mounting for said body in the form of an adapter plate wider than said body part to be interposed between said body and a bumper impact bar, the rear side of said body and the front side of said plate having interfitting parts for securely seating said body against said plate, the rear side of said plate being shaped to fit the curvature of the front face of an impact bar, and clamping means for clamping said body and plate together and to an impact bar.

3. A bumper guard assembly comprising a vertical guard member for extending vertically in front of a bumper impact bar, a separate seating member for said guard member in the form of an adapter plate, said guard member being recessed on its rear side, means defining a vertically extending channel in the front side of said plate and shaped to receive said guard member and to fit the recess thereof, the rear side of said plate being shaped to receive a bumper impact bar and to fit the curvature of the front face thereof, and means for securing said guard member and plate together and to an impact bar.

4. A bumper guard assembly comprising an impact bar and a separate adapter plate therefor, said adapter plate having a vertically extending groove in its front side for accurately receiving and seating the impact bar for vertical extension thereof in front of a bumper bar, the rear side of said plate being shaped for intimate engagement with the front face of a bumper bar, and means for clamping said impact bar and said plate together and to an impact bar.

5. A bumper guard assembly comprising a guard bar, an adapter plate extending laterally beyond the sides of said guard bar, means on the front side of said adapter plate for holding said bar in vertical position thereon, the rear side of said adapter plate being shaped to fit the front face of a horizontal bumper bar, said guard bar being hollow, and clamping means anchored in said hollow guard bar for clamping said bar and plate to a horizontal bumper bar, said clamping means being spaced to receive the bumper bar between them.

6. A bumper guard assembly comprising a guard bar and a separate adapter plate therefor, said plate having ribs extending forwardly and vertically thereon to define a channel for receiving and seating the guard bar in vertical position on the plate, the rear side of said plate being shaped to fit the front face of a bumper bar to which the guard assembly is to be applied, and clamping means for securing the guard bar and adapter plate together and to a bumper bar.

7. A bumper guard structure comprising a guard body, a plate wider than said body and interposed between said body and a bumper impact bar, the rear side of said body and the front side of said plate having interfitting parts for securely seating said body against said plate, the rear side of said plate being shaped to fit the curvature of the front face of an impact bar, and clamping means for clamping said body and plate to an impact bar.

8. A guard assembly for bumper impact bars comprising a guard bar, a plate wider than said guard bar serving as a support and escutcheon, said plate being shaped at its front and rear sides to fit the contour of said guard bar and the impact bar respectively, and means for securing said guard bar to an impact bar with the plate clamped therebetween.

JAY H. GOULD.